US 6,644,706 B2

(12) United States Patent
Rolph

(10) Patent No.: US 6,644,706 B2
(45) Date of Patent: Nov. 11, 2003

(54) SPORTS/UTILITY VEHICLE TRAILER

(76) Inventor: James N. Rolph, P.O. Box 2007, Mission Viejo, CA (US) 92690

( * ) Notice: Subject to any disclaimer, the term of this patent is extended or adjusted under 35 U.S.C. 154(b) by 0 days.

(21) Appl. No.: 10/345,119

(22) Filed: Jan. 15, 2003

(65) Prior Publication Data

US 2003/0137159 A1 Jul. 24, 2003

Related U.S. Application Data

(60) Provisional application No. 60/349,177, filed on Jan. 15, 2002.

(51) Int. Cl.[7] .................................................. B60P 3/34
(52) U.S. Cl. ..................... 296/26.08; 296/181; 280/402; 280/455.1
(58) Field of Search ............................... 296/26.08, 167, 296/181, 26.09; 254/419; 280/457, 456.1, 475, 455.1, 460.1, 490.1, 461.1, 402, 789, 478.1; 340/936; 66/177

(56) References Cited

U.S. PATENT DOCUMENTS

| | | | | |
|---|---|---|---|---|
| 3,658,359 A | * | 4/1972 | Claflin et al. | 254/419 |
| 3,782,759 A | * | 1/1974 | Thune | 280/457 |
| 3,790,191 A | * | 2/1974 | Gallatin | 280/456.1 |
| 3,836,178 A | * | 9/1974 | Ham | 296/167 |
| 3,841,663 A | * | 10/1974 | Proffit | 280/475 |
| 3,937,516 A | * | 2/1976 | Chapman | 296/26.08 |
| 4,025,085 A | * | 5/1977 | Jacobs | 280/455.1 |
| 4,305,602 A | * | 12/1981 | Ungvari et al. | 280/460.1 |
| 4,429,895 A | * | 2/1984 | Hunter | 280/490.1 |
| 4,887,859 A | * | 12/1989 | Aper | 296/26.08 |
| 4,995,664 A | * | 2/1991 | Buday | 296/26.08 |
| 5,108,144 A | * | 4/1992 | Crowley | 296/26.08 |
| 5,180,205 A | * | 1/1993 | Shoop | 296/181 |
| 5,231,393 A | * | 7/1993 | Strickland | 340/936 |
| 5,348,329 A | * | 9/1994 | Morin et al. | 280/461.1 |
| 5,540,540 A | * | 7/1996 | Peterson | 280/402 |
| 5,785,330 A | * | 7/1998 | Shoquist | 280/475 |
| 5,794,959 A | * | 8/1998 | Scheef, Jr. | 280/789 |
| 5,997,024 A | * | 12/1999 | Cowley | 280/478.1 |
| 6,199,894 B1 | * | 3/2001 | Anderson | 296/26.08 |
| 6,490,890 B1 | * | 12/2002 | Irvin et al. | 66/177 |

FOREIGN PATENT DOCUMENTS

| DE | 3336014 | * | 4/1985 |
|---|---|---|---|
| DE | 42 20 438 | * | 12/1993 |

* cited by examiner

*Primary Examiner*—Kiran Patel
(74) *Attorney, Agent, or Firm*—Lynn & Lynn

(57) ABSTRACT

A trailer and hitch assembly are arranged so that the trailer may be towed closely behind a motor vehicle without articulation. A pair of frame members extends forward from the trailer for engagement into a corresponding pair of receivers that are included in a hitch extension assembly. Locking mechanisms are arranged to secure the frame members to a hitch cross member that may be included in a standard trailer hitch connected to the motor vehicle.

8 Claims, 8 Drawing Sheets

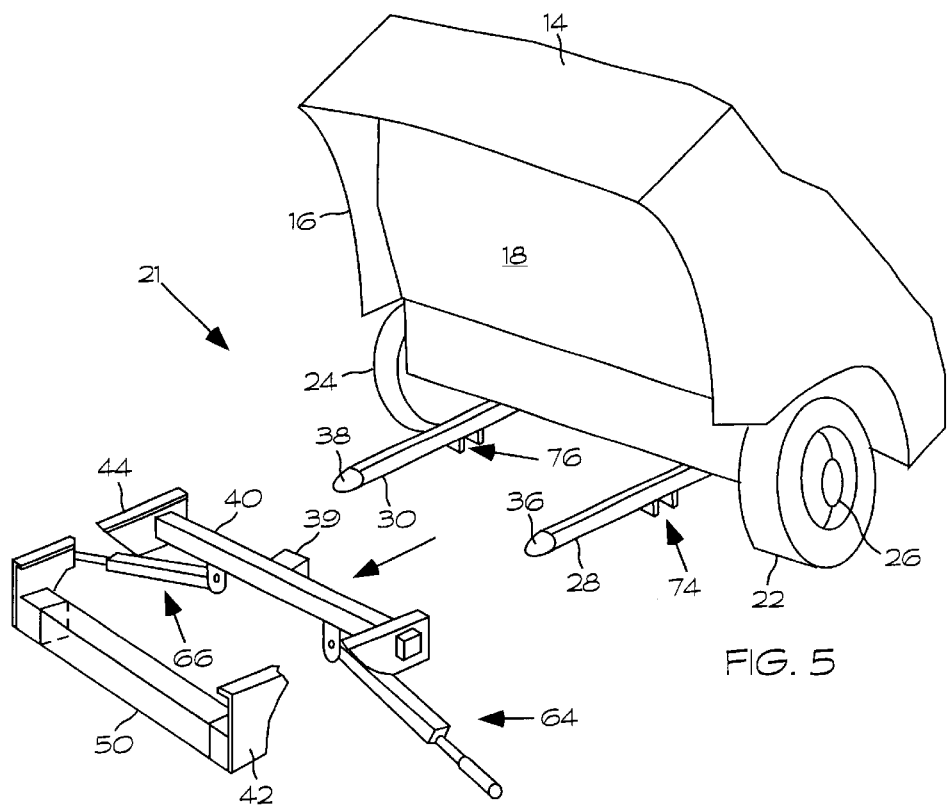
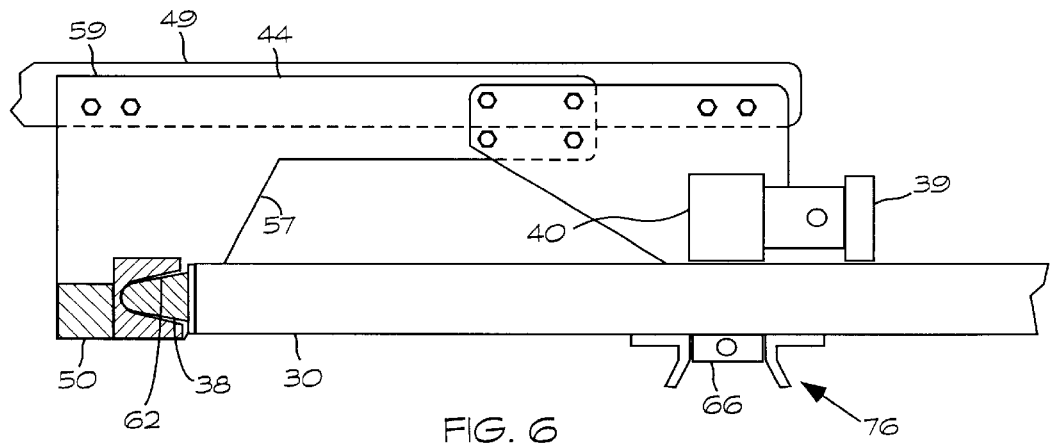

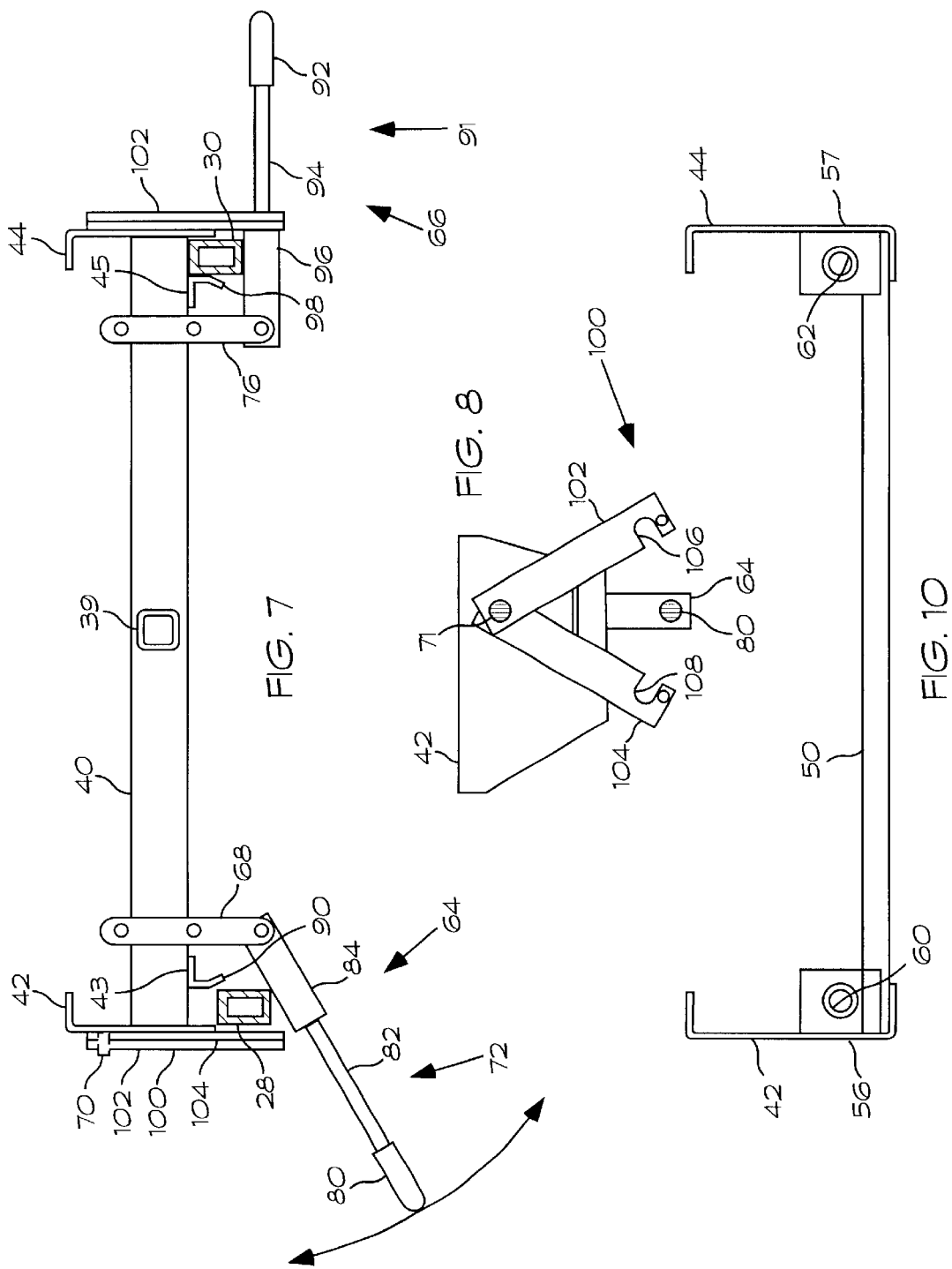

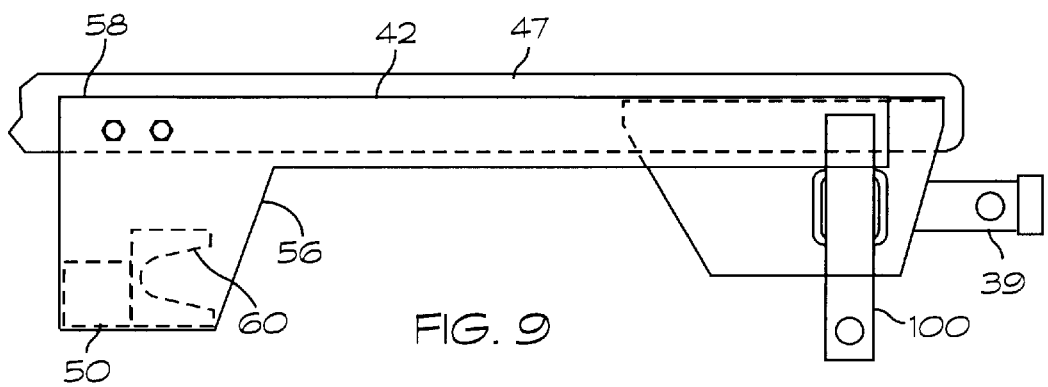
FIG. 9
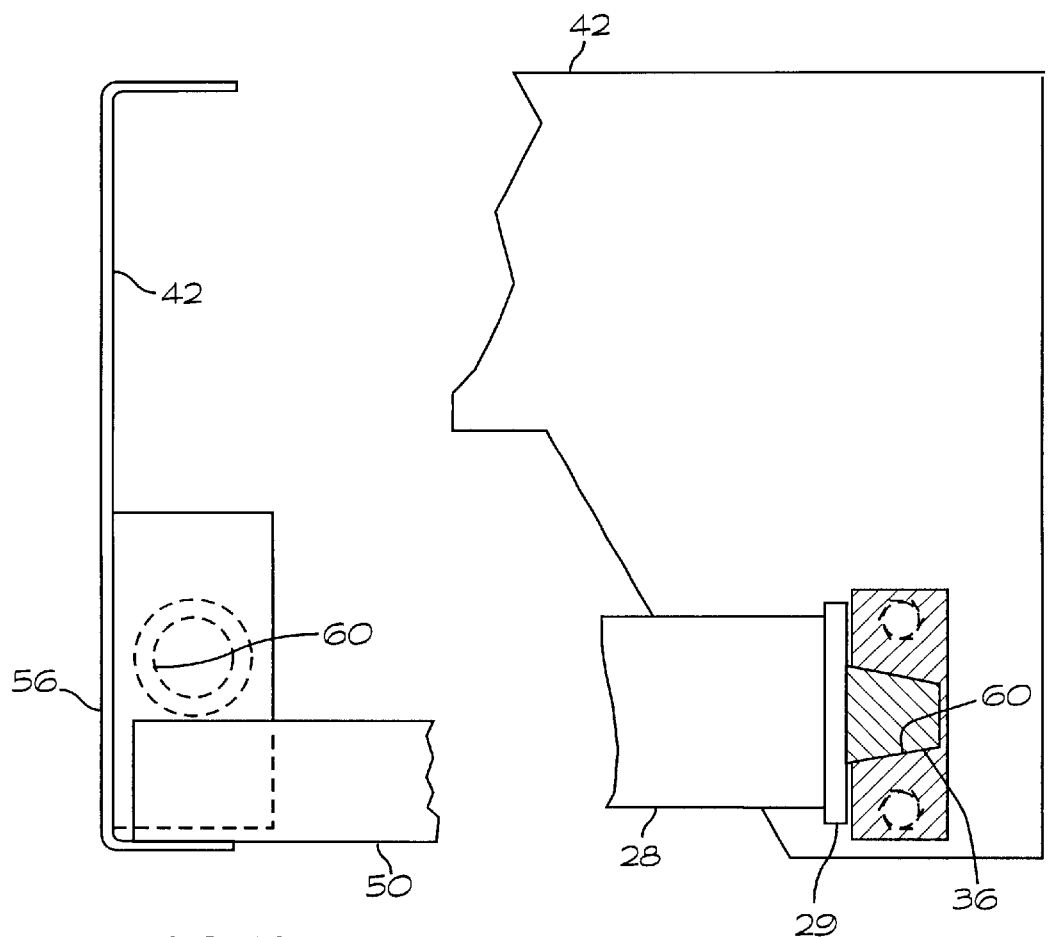
FIG. 12
FIG. 11

SPORTS/UTILITY VEHICLE TRAILER

This application claims the benefit of provisional application No. 60/349,177, filed Jan. 15, 2002.

BACKGROUND OF THE INVENTION

This invention relates generally to a trailer suitable for being towed by a sports/utility vehicle (SUV). In particular, this invention relates to a motor home trailer that is attached to a sports/utility vehicle by a non-articulated connection so that the trailer may be connected closely behind the towing vehicle.

SUMMARY OF THE INVENTION

This invention is directed to a trailer suitable for being towed by an SUV. The invention includes a hitch mechanism that is unarticulated so that the trailer may be towed while positioned very closely behind the SUV. A shroud extends between the outer shell of the trailer and the rear of the SUV to provide reduced wind resistance while the trailer is being towed.

BRIEF DESCRIPTION OF THE DRAWINGS

FIG. 5 is an exploded perspective view showing the front wall of the trailer and the hitch assembly of FIG. 4;

FIG. 6 is a side elevation view and partial cross sectional view of the hitch assembly of FIGS. 5 and 6;

FIG. 7 is an elevation view showing a lift and lock device that may be used to fasten the trailer to the hitch assembly;

FIG. 8 illustrates a swing gate that may be included in the hitch assembly;

FIG. 9 is an elevation view showing a hitch extension and a pair of receivers and a cross bar that may be included in the hitch extension;

FIG. 10 is an elevation view showing a second embodiment of a hitch extension that may be included in the hitch assembly;

FIG. 11 is a side view showing a portion of the trailer frame extending into a receiver that may be included in the hitch extension;

FIG. 12 is and end view showing the hitch extension, the receiver of FIG. 11 and a cross bar that may be included in the hitch extension.

DETAILED DESCRIPTION OF THE INVENTION

Figure 1:
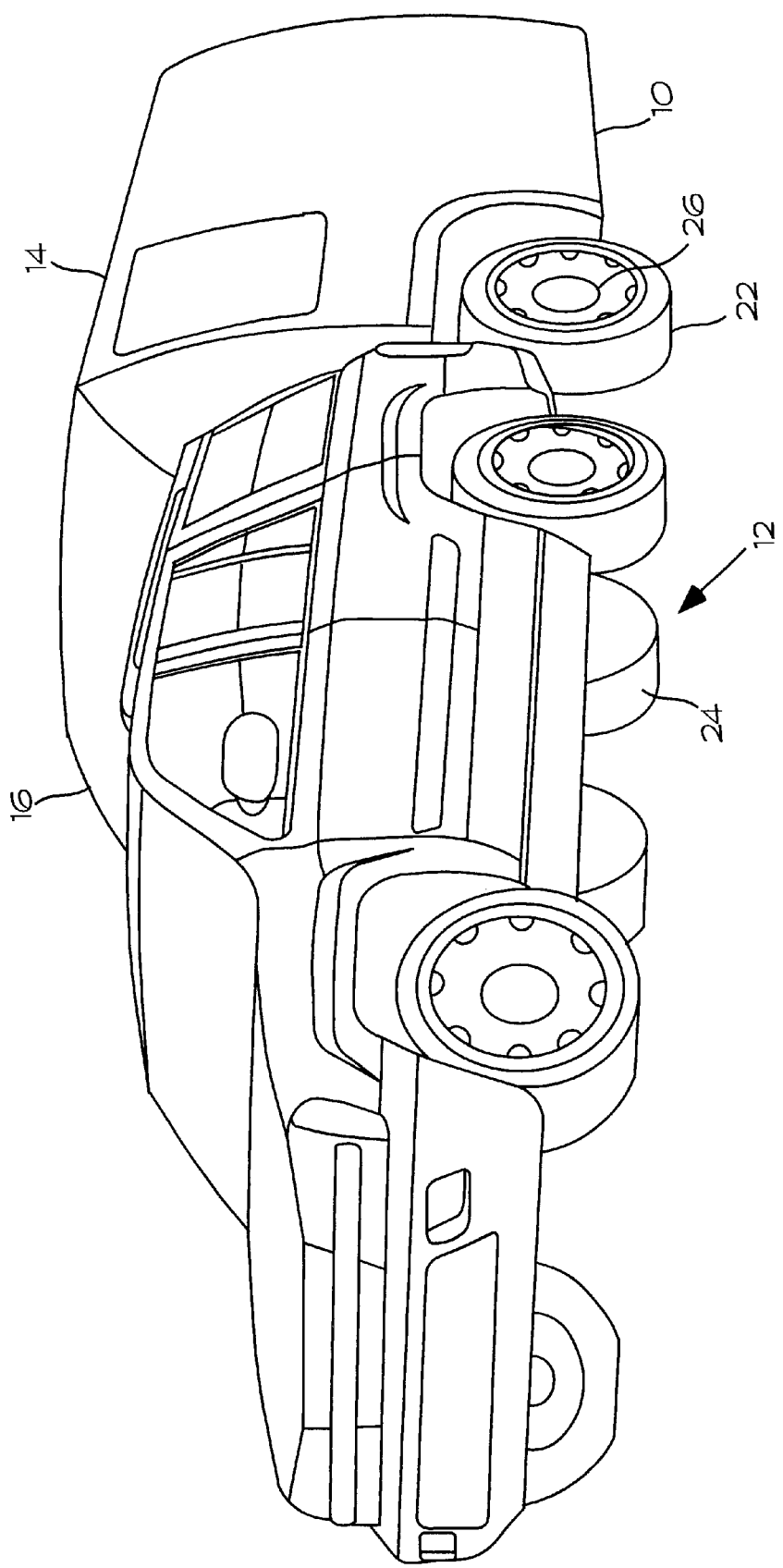
FIG. 1 is a perspective view of a trailer according to the invention connected to an SUV.
Figure 2:
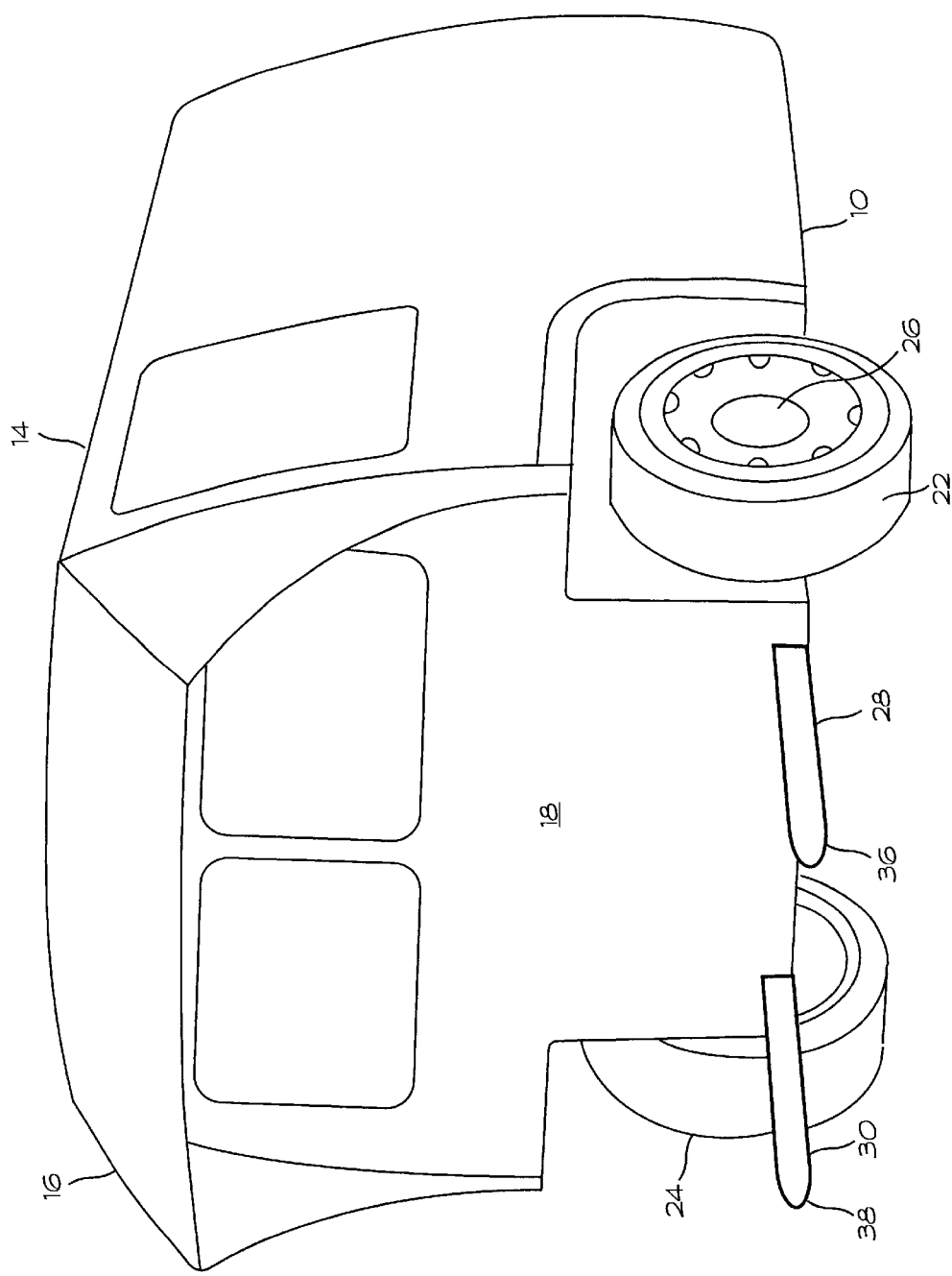
FIG. 2 is a perspective view showing the front and left side of the trailer of FIG. 1.
Figure 3:
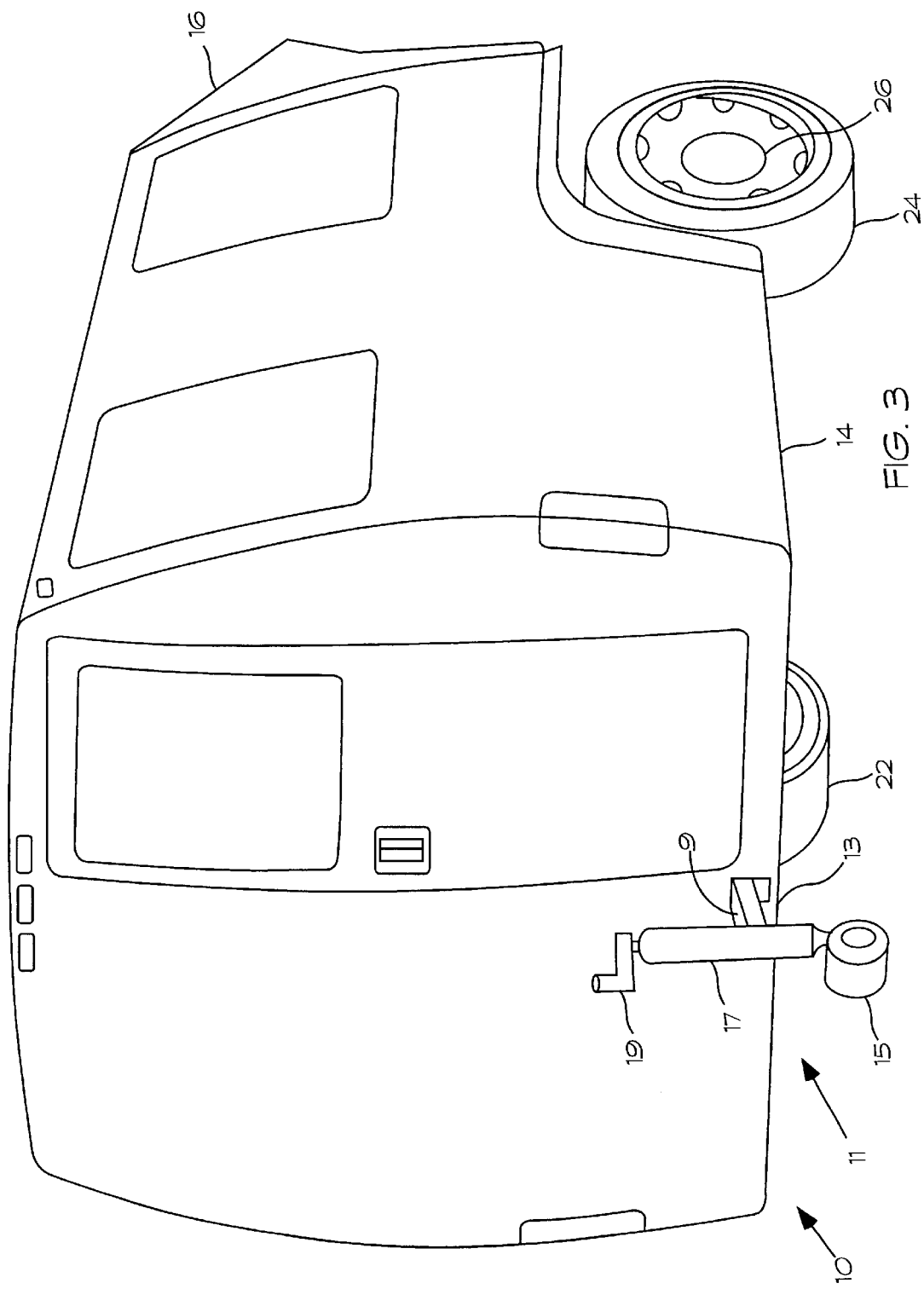
FIG. 3 is a perspective view showing the rear and right side of the trailer according to the invention.

As shown in FIG. 1, a trailer 10 according to the invention is designed to be towed while connected closely behind an SUV 12. As shown in FIGS. 1–3, the trailer 10 includes an outer shell 14 and a shroud 16 that extends between a front wall 18 of the outer shell 14 to a region near the rear end 20 of the SUV when the trailer 10 and SUV 12 are connected together. The shroud 16 and the small distance between the front wall 18 and the rear 20 of the SUV provide reduced wind resistance on the trailer 10 when it is being towed by the SUV 12.

FIG. 3 shows a support device 11 that may be mounted to the rear end 13 of the trailer 10. The support device 11 preferably includes a wheel 15 and a jacking device 17 that is operated by a jack handle 19. The support device 11 may be used to position the trailer 10 for attachment to the SUV. The support device 11 may be connected to a receiver 9 mounted to the rear of the trailer 10. The support device 11 is detached from the trailer 10 so that it may be safely towed. A second trailer (not shown) may be connected to the receiver 9 for towing behind the trailer 10.

Figure 4:
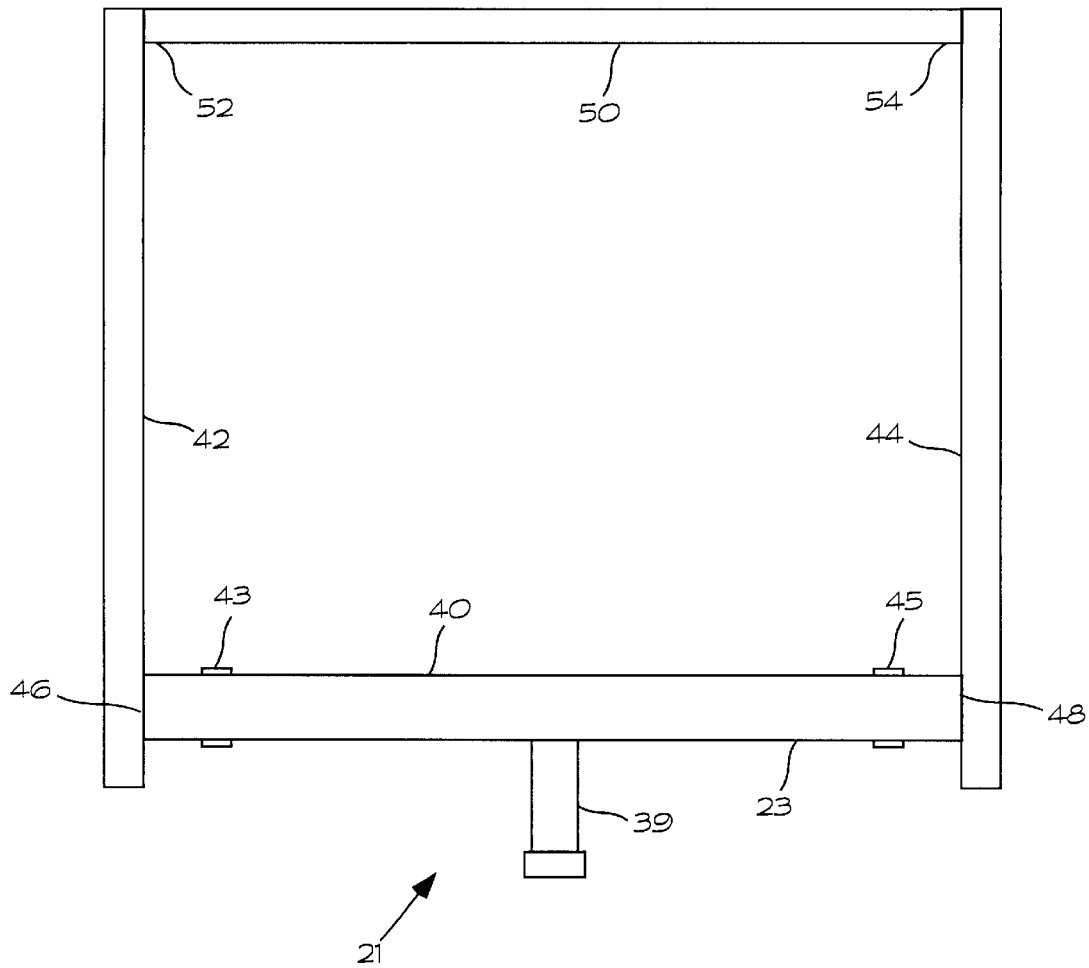
FIG. 4 is a top plan view of a hitch assembly that may be used to connect the trailer according to the invention to the SUV.

FIG. 4 is a top plan view showing portions of a hitch assembly 21 that may be included in the invention to tow the trailer 10 in an unarticulated manner. The hitch assembly 21 may be used to attach the trailer 10 rigidly to the SUV 12 to form a unitary structure 3 The hitch assembly 21 includes a standard trailer hitch 23 that includes a hitch cross tube 40 and a standard receiver 39 where a hitch ball assembly (not shown) may be mounted. The present invention uses the hitch cross tube 40 but does not use the standard receiver 39. A pair of hitch extension members 42 and 44 extend perpendicularly from the hitch cross tube 40. The hitch extension members 42 and 44 may be formed as bars or elongate plates. A second cross tube 50 extends between the hitch extension members 42 and 44. The cross tubes 40 and 50 are preferably generally parallel and spaced apart by substantially the length of the hitch extension members 42 and 44. The hitch assembly 21 also preferably includes a pair of guides 43 and 45 connected to the bottom side of the cross tube 40. The guides 43 and 45 are useful in attaching the trailer 10 to the SUV 12 as explained below.

FIG. 5 is an exploded perspective view of a structure for the hitch assembly 21. As shown in FIGS. 1–3 and 5, the trailer 10 has a pair of wheels 22 and 24 mounted on an axle 26. A pair of frame horns 28 and 30 extends from bottom portions 32 and 34 of the trailer 10. The frame horns 28 and 30 may be connected to the trailer 10 in a manner suitable for towing the trailer 10 and supporting its weight. The frame horns 28 and 30 preferably are formed as rods or beams having tapered, conical or frustoconical front portions 36 and 38 as shown in FIGS. 5 and 6 and 12.

As shown in FIG. 5, the SUV 12 has a standard trailer hitch receiver 39 that is mounted to a hitch cross tube 40. The hitch cross tube 40 is generally perpendicular to the longitudinal axis of the SUV 12 and is secured to the SUV in a standard manner well known in the art of vehicle construction. The hitch extension members 42 and 44 are connected to opposite ends 46 and 48, respectively, of the hitch cross tube 40. The hitch extension members 46 and 48 may be formed as rods, beams, tubes or the like and extend generally perpendicularly from the hitch cross tube 40 toward the front of the SUV 12. A cross tube 50 preferably extends between the front ends 52 and 54 of the hitch extension members 46 and 48, respectively. Referring to FIG. 9, the hitch extension member 42 may be bolted to a frame member 47 of the SUV 12. Referring to FIG. 6, the hitch extension member 44 may be bolted to a frame member 49 of the SUV 12. Other fastening means well-known in the art may be used to connect the hitch extension members 42 and 44 to the SUV 10.

As shown in FIG. 9–12, the hitch extension member 42 preferably has a downward extending portion 56 at the front end 58. As shown in FIG. 6, the hitch extension member 44 has a similar downward extending portion 57 at its front end 59. The downward extending portion 56 includes a receiver 60 that faces toward the rear of the SUV 12, and the downward extending portion 57 includes a similar receiver 62. The receivers 60 and 62 are arranged to receive the ends 36 and 38, respectively, of the frame horns 28 and 30 when the front of the trailer 10 and the rear of the SUV 12 are sufficiently close together.

Figure 13:
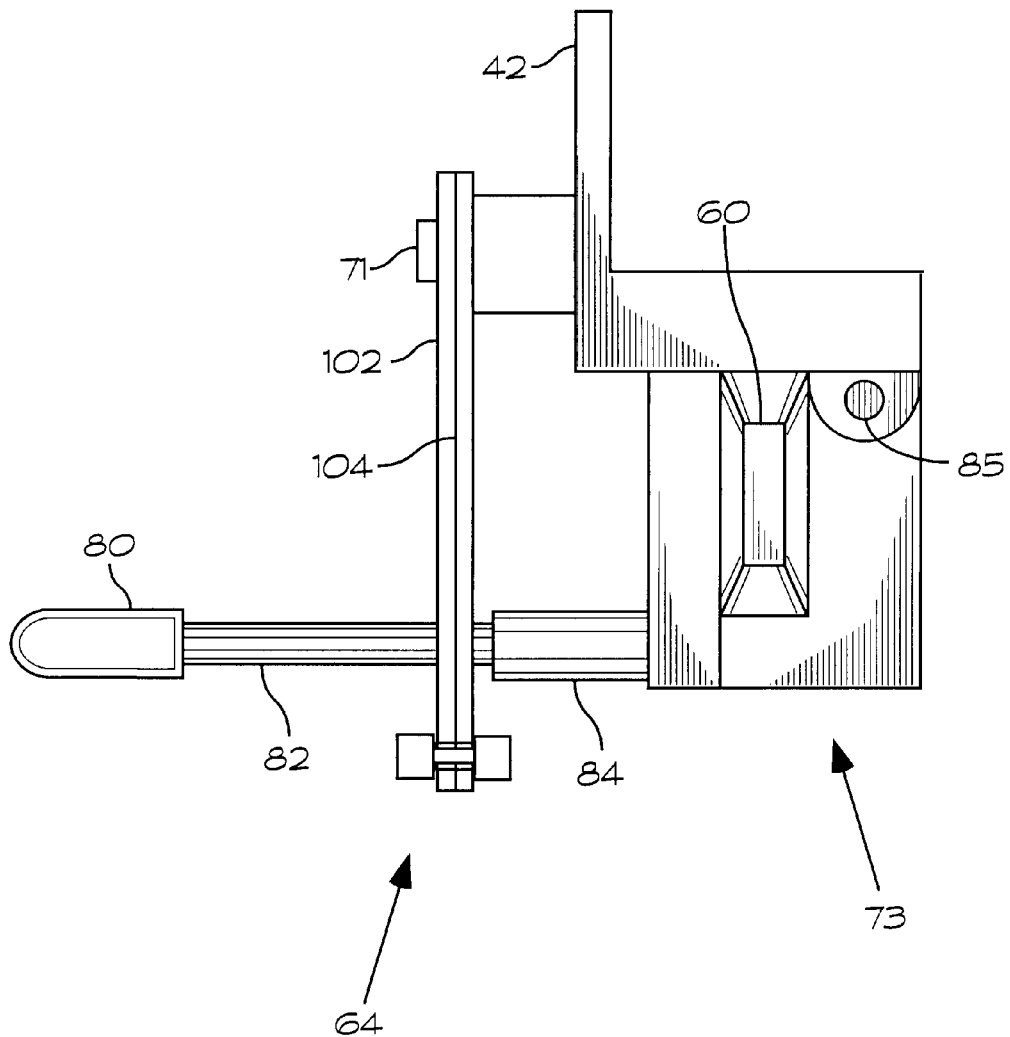
FIG. 13 is a front elevation view showing a swing gate assembly that may be included in the invention.

Referring to FIGS. 5–8, the hitch assembly 21 includes a first lift and lock mechanism 64 and a second lift and lock mechanism 66 that are arranged to fasten the frame horns 28 and 30, respectively, to the hitch cross tube 40. The lift and lock mechanisms 64 and 66 are preferably substantially identical. Therefore, only the lift and lock mechanism 64 is described in detail. The first lift and lock mechanism 64 includes a bracket 68 that connects an end 70 of a lever 72 to the hitch cross tube 40. The lift and lock mechanism 64 may be connected to the hitch extension member 42 by a bracket 73 as shown in FIG. 13 in which case the lift and lock mechanism 64 may be at any convenient location along the length of the hitch extension member 42. The second lift and lock mechanism 66 is mounted across from the first lift and lock mechanism 64. The frame horns 28 and 30 may include brackets 74 and 76, respectively. When the end 36 of the frame horn 28 is seated in the receiver 60, the bracket 74 is vertically aligned with the first lift and lock mechanism 64. The lever 72 may then be raised to a generally horizontal position in which the first lift and lock mechanism 64 is locked into engagement with the bracket 74 to securely fasten the frame horn 28 to the hitch assembly 21.

The second lift and lock mechanism 66 is similarly locked into engagement with the bracket 76 to securely fasten the frame horn 30 in the receiver 62. The brackets 74 and 76 function as stops to prevent rearward movement of the trailer 10 relative to the SUV 12.

As shown in FIG. 7, the lever 72 may have a handle 80, a cylindrical portion 82 connected to the handle 80 and an elongated rectangular tubing portion 84 extending from the cylindrical portion 82. The lift and lock mechanism 66 includes a lever 91 that has a handle 92, a cylindrical portion 94 and a rectangular tubular portion 96. Connecting the trailer 10 to the SUV 12 involves inserting the frame horns 28 and 30 under the hitch cross tube 40 so that the ends 36 and 38 of the frame horns 28 and 30, respectively extend into their respective receivers 60 and 62. The lift and lock mechanism 66 may be used to raise the frame horn 30 so that it is adjacent the lower edge of the hitch cross tube 40. The guide 45 has an angled projection 98 that guides the frame horn 30 into the proper position as shown in FIG. 7.

The lift and lock mechanism 64 is then used to lift the frame horn 28 to a location where it is adjacent the hitch cross tube 40 with the end of the frame horn 28 inserted in the receiver 60. The guide 43 has an angled projection 90 that guides the frame horn 28 into the desired position adjacent the cross member 40.

As shown in FIG. 13, the lift and lock mechanism 64 is mounted to the bracket 73, which is pivotally mounted to the hitch extension member 42 by pin 85. The lift and lock mechanism 66 may be similarly mounted to the hitch extension member 44.

FIG. 8 illustrates a swing gate mechanism 100 that may be included in the lift and lock mechanism 64. Two swing members 102 and pivotally connected to the frame extension member 42 so that they may rotate about a rod 71. The swing members 102 and 104 include facing recesses 106 and 108, respectively. The handle 80 is used to lift the cylindrical portion 82 of the lever 72 into vertical alignment with the recesses 106 and 108 while the swing members 102 and 104 are held apart. The swing members are then allowed to swing downward until the cylindrical portion 82 of the lever 72 is secured inside the recesses 106 and 108. The lift and lock mechanism 66 includes a swing gate 102 that is substantially identical to the swing gate 100.

What is claimed is:

1. A trailer and hitch assembly for connection to a motor vehicle having a standard trailer hitch that includes a hitch cross member, comprising:
    a pair of frame horns extending from the trailer, the frame horns being generally parallel and attached to the trailer in a manner suitable for towing it; and
    a hitch extension assembly connected to the standard trailer hitch, the hitch extension assembly including:
        a pair of hitch extension members connected to opposite ends of the hitch cross member and extending forward and generally perpendicularly therefrom;
        a pair of receivers arranged in forward portions of the hitch extension members so that ends of the frame horns may be inserted therein; and
        a pair of lift and lock mechanisms arranged to lift the frame horns and lock them to the hitch cross member so that the trailer may be towed by the motor vehicle without articulation relative to the motor vehicle.

2. The trailer and hitch assembly of claim 1, further comprising a cross bar extending between the forward end portions of the hitch extension members.

3. The trailer and hitch assembly of claim 2, wherein each of the lift and lock mechanisms includes:
    a mounting bracket connected to the hitch cross member;
    a lever connected to the mounting bracket; and
    a locking mechanism arranged to lock the lever to the corresponding hitch extension member.

4. The trailer and hitch assembly of claim 3 wherein each of the frame horns includes a detent arranged to cooperate with the lift and lock mechanisms to restrain the frame horns against movement relative to the hitch cross member.

5. The trailer and hitch assembly of claim 4, further including a pair of guides mounted to the hitch cross member to guide the frame horns into predetermined positions relative to the hitch cross member as the frame horns are engaged with the receivers.

6. The trailer and hitch assembly of claim 1, wherein each of the lift and lock mechanisms includes:
    a bracket connected to the hitch cross member;
    a lever connected to the bracket; and
    a locking mechanism arranged to lock the lever to the corresponding hitch extension member.

7. The trailer and hitch assembly of claim 1, further comprising a shroud extending from a front portion of the trailer toward the motor vehicle.

8. A trailer adapted to be connected to a towing vehicle via a non-articulated hitch assembly, comprising:
    a frame;
    an outer shell connected to the frame;
    a shroud extending from a forward portion of the outer shell to reduce wind resistance between the trailer and the towing vehicle; and
    a support device for positioning the trailer for attachment to the towing vehicle and for supporting a rear portion of the trailer when it is not connected to the towing vehicle.

* * * * *